Figure 1:
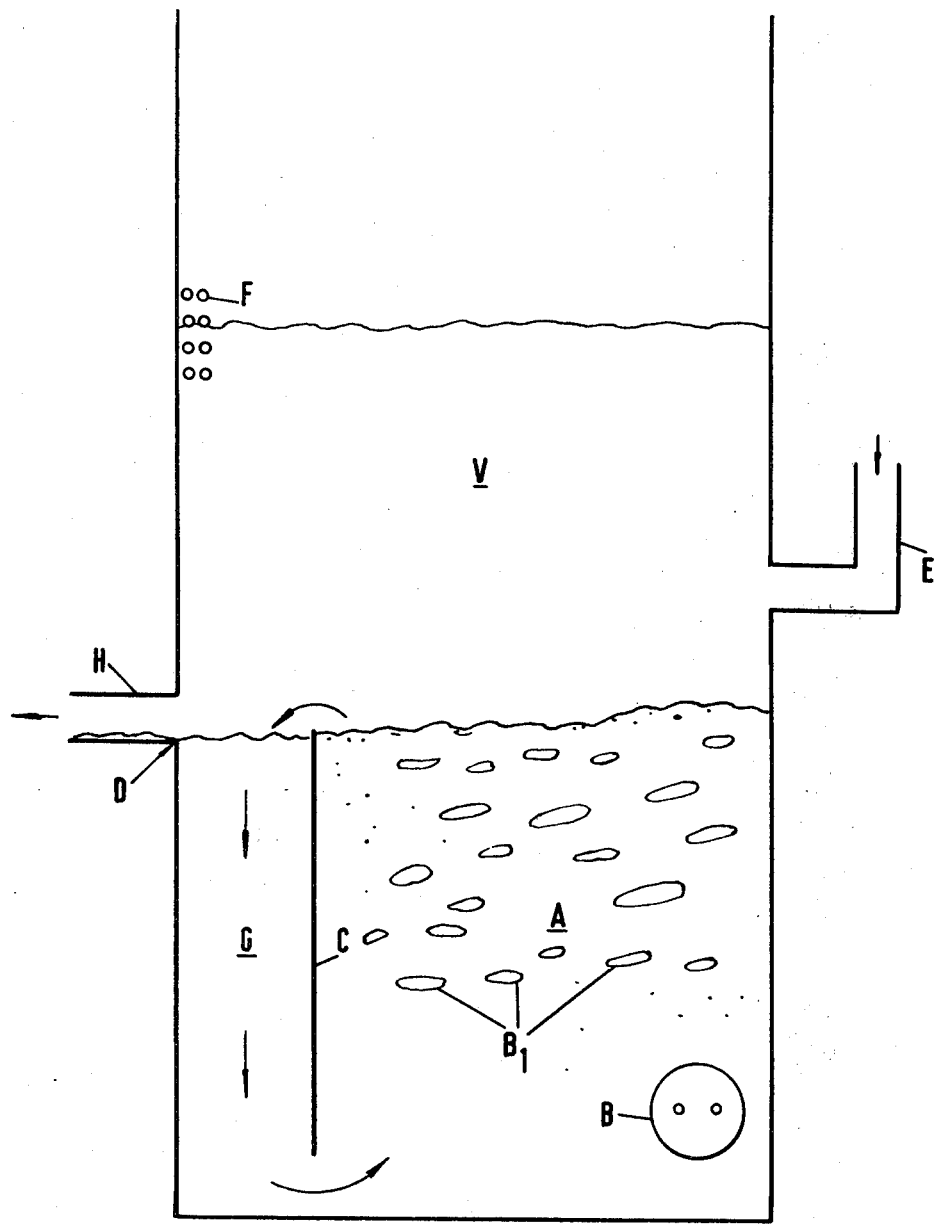

United States Patent [19]

Slinn et al.

[11] 4,150,493
[45] Apr. 24, 1979

[54] DRYING OF ARTICLES

[75] Inventors: David S. L. Slinn; Noel Plummer, both of Bristol, England

[73] Assignee: I.S.C. Chemicals Limited, London, England

[21] Appl. No.: 848,727

[22] Filed: Nov. 4, 1977

[30] Foreign Application Priority Data

Nov. 4, 1976 [GB] United Kingdom ............... 45996/76

[51] Int. Cl.² .............................................. F26B 3/00
[52] U.S. Cl. ............................................. 34/9; 34/48; 34/60; 220/20.5
[58] Field of Search ................ 34/9, 48, 60; 220/20.5; 432/29, 120, 199, 220

[56] References Cited

U.S. PATENT DOCUMENTS

| 3,589,023 | 6/1971 | Figiel | 34/9 |
| 3,698,096 | 10/1972 | Wininger, Jr. | 34/9 |
| 3,886,668 | 6/1975 | Remond | 34/9 |
| 4,014,451 | 3/1977 | Cannon et al. | 220/20.5 |

Primary Examiner—Leland A. Sebastian
Attorney, Agent, or Firm—Holman & Stern

[57] ABSTRACT

Drying articles by displacement and/or solubilization of water with an organic solvent, by dipping the article into a body of solvent which is made effervescent, the said body of solvent being separated, except at the top and bottom thereof, from a non-effervescent body of solvent by means of a baffle wall which extends from a level above the bottom of the solvent container to substantially the surface level of solvent in the container, whereby a circulation of solvent is set up between the effervescent and non-effervescent bodies, and water is removed from the upper part of the non-effervescent body of solvent.

14 Claims, 2 Drawing Figures

DRYING OF ARTICLES

This invention relates to the drying of articles, in particular by displacement and/or solubilization of water by means of an organic solvent, e.g. a halogenated hydrocarbon.

Because of their high density and non-flammable nature, combined with an ability to produce fast, stain-free water removal, halogenated hydrocarbons are widely used as dewatering agents, often in combination with suitable surface active agents. Halogenated hydrocarbons give a displacement effect to the water and significantly enhance the drying process.

After water has been removed from the wet object, two principal methods are used to eliminate water from the drying system. These methods are often used in combination.

The first method is to eliminate water by evaporation and this can be conveniently done by heating the solvent, most commonly in a vapour-degreasing type tank. Evaporated water co-distils with the solvent and is then recondensed and passed through a gravity water separator. Water is collected as an upper layer, which is led to waste, and the lower solvent layer is returned to the tank. Although this method is effective for small quantities of water the work throughput is limited by the heat input to the tank and other contributary factors such as solvent boiling point.

In a second method, where large quantities of water have to be removed, a weir technique is employed. This requires a pump which circulates the solvent over a weir, through a water separator and back to the water removal section.

With solvent drying processes, the above two methods, used in combination, are very effective where the dried object has to have a clean surface, since heating the solvent allows redistilled solvent washing and vapour washing techniques.

The pump is an important part of the equipment where weir techniques are used, and because of compatibility problems encountered with polymeric seals it is often difficult to obtain suitable pumps. Acceptable pumps are often expensive and, furthermore, require pipework and valves to be added to the system. Filters attached to such pumps often clog causing the system to become ineffective.

It is an object of the present invention to provide a method of circulating water-containing solvent over a weir without employing a conventional pump having moving parts, thus avoiding the consequent problems of maintenance, extra pipework, solvent attack and corrosion on the pump parts.

The present invention in one aspect provides a method of drying articles by displacement and/or solubilization of water with an organic solvent, comprising dipping the article into a body of solvent which is made effervescent by rising gas or vapour bubbles, the said body of solvent being separated, except at the top and bottom thereto, from a non-effervescent body of solvent by means of a baffle wall which extends from a level above the bottom of the solvent container to substantially the surface level of solvent in the said container, whereby a circulation of solvent is set up between the effervescent and non-effervescent bodies, and water is removed from the upper part of the non-effervescent body of solvent.

Preferably the gas or vapour bubbles are generated by boiling solvent on one side of the baffle wall by means of an immersion heater. Alternatively the gas or vapour bubbles can be generated by sparging the body of solvent with a gas such as air.

The non-effervescent body of solvent may suitably communicate with a water/solvent separator by way of an overflow weir.

The organic solvent is preferably an halogenated hydrocarbon, e.g. a chlorinated or chlorofluorinated derivative of ethylene or ethane. More preferably a chlorinated ethane or ethylene or a chlorofluoro-ethane is used.

The invention in another aspect provides apparatus for drying articles by displacement and/or solubilization of water with an organic solvent, comprising at least one solvent container compartment which is divided into two parts, except at the top and bottom thereof, by means of a substantially vertical baffle wall which extends from a level above the bottom of the container to a desired solvent surface level, one part of the said solvent container being provided with means for generating gas or vapour bubbles in that part and the other part communicating, via an overflow weir, with a solvent/water separator.

The means for generating gas or vapour bubbles preferably comprises an immersion heater for boiling the solvent.

Preferably the apparatus further includes at least one further solvent container compartment equipped with a heater.

The apparatus may also include means for returning separated solvent from the water separator to one or other of the solvent container compartments, preferably to a compartment remote from that having the baffle wall.

The apparatus may be suitably additionally provided with cooling coils for returning condensed solvent to one or other of the solvent container compartments, preferably to the body of solvent communicating with the water separator.

Figure 2:
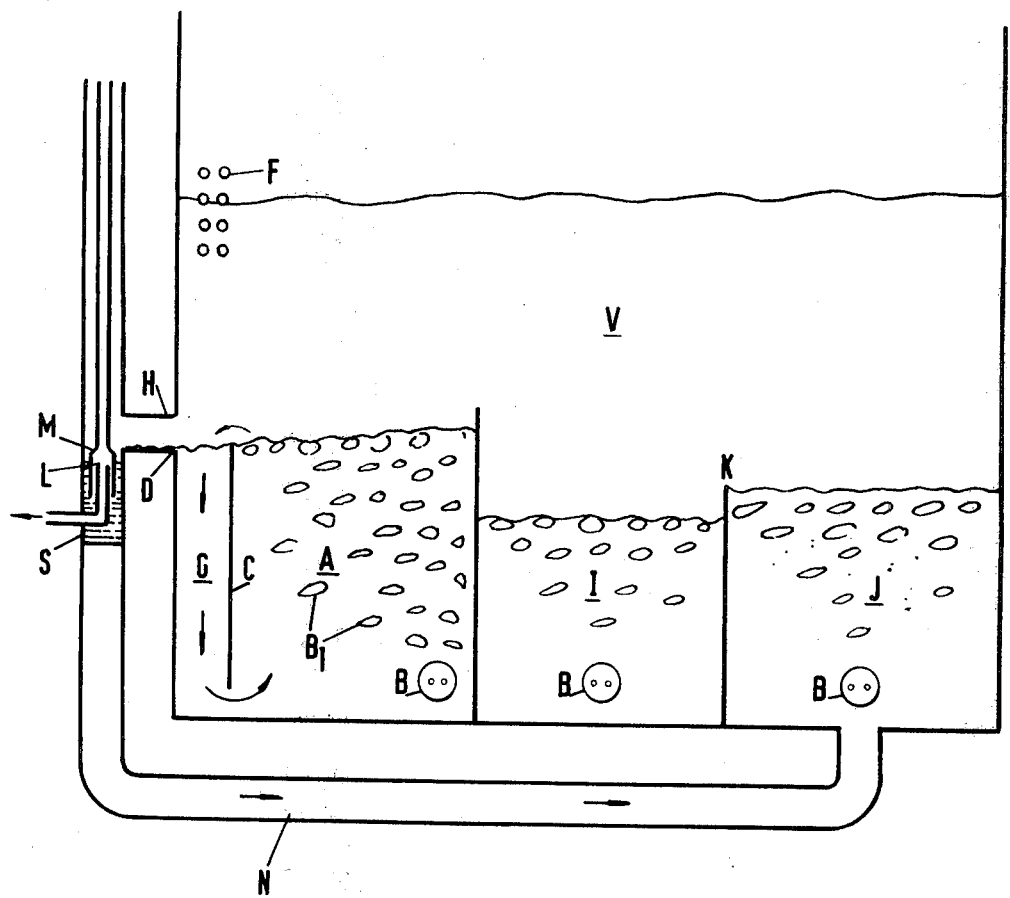

The invention will be further described by way of example only, with reference to the accompanying drawings, in which:

FIG. 1 is a diagrammatic representation of a part of a de-watering apparatus according to the invention; and FIG. 2 is a diagrammatic representation of the whole of the de-watering apparatus.

FIG. 1 shows a solvent container divided into two compartments A and G. Compartment A containing solvent, vigorously boiled by means of a heater B, is separated from compartment G by a baffle wall C which extends right across compartment A and to a depth about 1 inch from the bottom of compartment A. The top of baffle wall C is at a level typically ¼ of an inch above a water/solvent outlet D. However, this level difference can vary with the depth of compartment A and with the vigour of boiling. The level of solvent in compartment A is maintained by a feed E, which is normally supplied by condensed solvent from other boiling solvent compartments of the system. The vapour V generated in compartment A is controlled by cooling coils F, whereby the liquid condenses and falls back into the container.

When boiling commences by means of heater B, bubbles $B_1$ of vaporised liquid are continuously formed in compartment A. However, these vapour bubbles are prevented from entering compartment G by means of baffle wall C. The combined effect is that the overall density of the fluid (liquid and vapour) in compartment A is less than in G causing flow of liquid in a circulatory path, as shown by arrows in FIG. 1, over the top of baffle C. The constructure as described thus constitutes a differential density pump capable of moving significant quantities of liquid without moving parts.

This pump can thus be used to good effect in drying techniques where the wet component is immersed in compartment A containing a boiling halocarbon. Removed water rises to the surface and is pumped over the top of baffle wall C. The addition of the water and feed solvent volumes to the total volumes A and G causes a mixture of water and solvent to flow through a pipe H to a water separator (not shown in FIG. 1).

The basis of a practical dewatering system incorporating such a differential density pump is shown in FIG. 2 where the letters A to H indicate the same parts as in FIG. 1, and letters I and J indicate further solvent compartments separated by a weir K. Removed water flows into a water separator S where the depth of water is controlled by the level of the weir K below a water outlet pipe at L. A vapour trap M is at such a height to prevent solvent vapour from escaping down the water outlet pipe both when the system is dry and with water being removed. Where no water is being removed the solvent level in the water separator S is identical to weir K because of a connecting pipe N.

When the three heaters B in the respective compartments A, I and J are operating, the resultant vapour is condensed on cooling coils F which feed into sections G and A. Solvent flows from here through the water separator S, back to compartment J where it overflows over weir K into compartment I. As there is no net feed to compartment I, evaporative losses from the system are evident here. Furthermore, as there is no outlet from compartment I a surface active agent may be added here if desired.

A typical drying sequence would be thus to immerse the wet component in solvent in compartment A, where the majority of the water is removed (97%), followed by immersion in compartment I, where the surfactant solubilizes the remaining water, and finally rinsing in compartment J. Water solubilized in compartment I is removed by evaporation and condenses at F from whence it flows through the water separation system.

We claim:

1. A method of drying articles by at least one of displacement and solubilization of water with an organic solvent which is more dense than water, comprising dipping the article into a body of said solvent in a container, said body being made effervescent by rising gaseous bubbles, and said body being separated, except at the top and bottom thereof, from a non-effervescent body of solvent by means of a baffle wall which extends from a level above the bottom of the solvent container to substantially the surface level of solvent in said container, said rising gaseous bubbles causing a circulation of solvent between the effervescent and non-effervescent bodies, and removing water from the upper part of the non-effervescent body of solvent.

2. A method according to claim 1 comprising generating the gaseous bubbles by boiling solvent on one side of the baffle wall by means of an immersion heater.

3. A method according to claim 1 comprising generating the gaseous bubbles by sparging the body of solvent with a gas.

4. A method according to claim 1 wherein the non-effervescent body of solvent communicates with a water/solvent separator by way of an overflow weir.

5. A method according to claim 1 wherein the organic solvent is an halogenated hydrocarbon.

6. A method according to claim 5 wherein the solvent is selected from chlorinated and chlorofluorinated derivatives of ethylene and ethane.

7. A method according to claim 6 wherein the solvent is a chlorofluoro-ethane.

8. Apparatus for drying articles by at least one of displacement and solubilization of water with an organic solvent, comprising at least one solvent container compartment, a substantially vertical wall within said container and which extends from a level above the bottom of the container to a desired solvent surface level to divide said compartment into two parts except at the top and bottom thereof, means for generating gaseous bubbles in one part of said solvent container, and an overflow weir between the other part of said solvent container and a solvent/water separator.

9. Apparatus according to claim 8 wherein said means for generating gaseous bubbles comprises an immersion heater for boiling the solvent.

10. Apparatus according to claim 9 which further comprises at least one further solvent container compartment equipped with a heater.

11. Apparatus according to claim 8 which further comprises means for returning separated solvent from the water separator to one of the solvent container compartments.

12. Apparatus according to claim 11 wherein the solvent is returned to a compartment remote from that having the baffle wall.

13. Apparatus according to claim 8 further comprising cooling coils for returning condensed solvent to one of the solvent container compartments.

14. Apparatus according to claim 13 wherein condensed solvent is returned to the body of solvent communicating with the water separator.

* * * * *